UNITED STATES PATENT OFFICE.

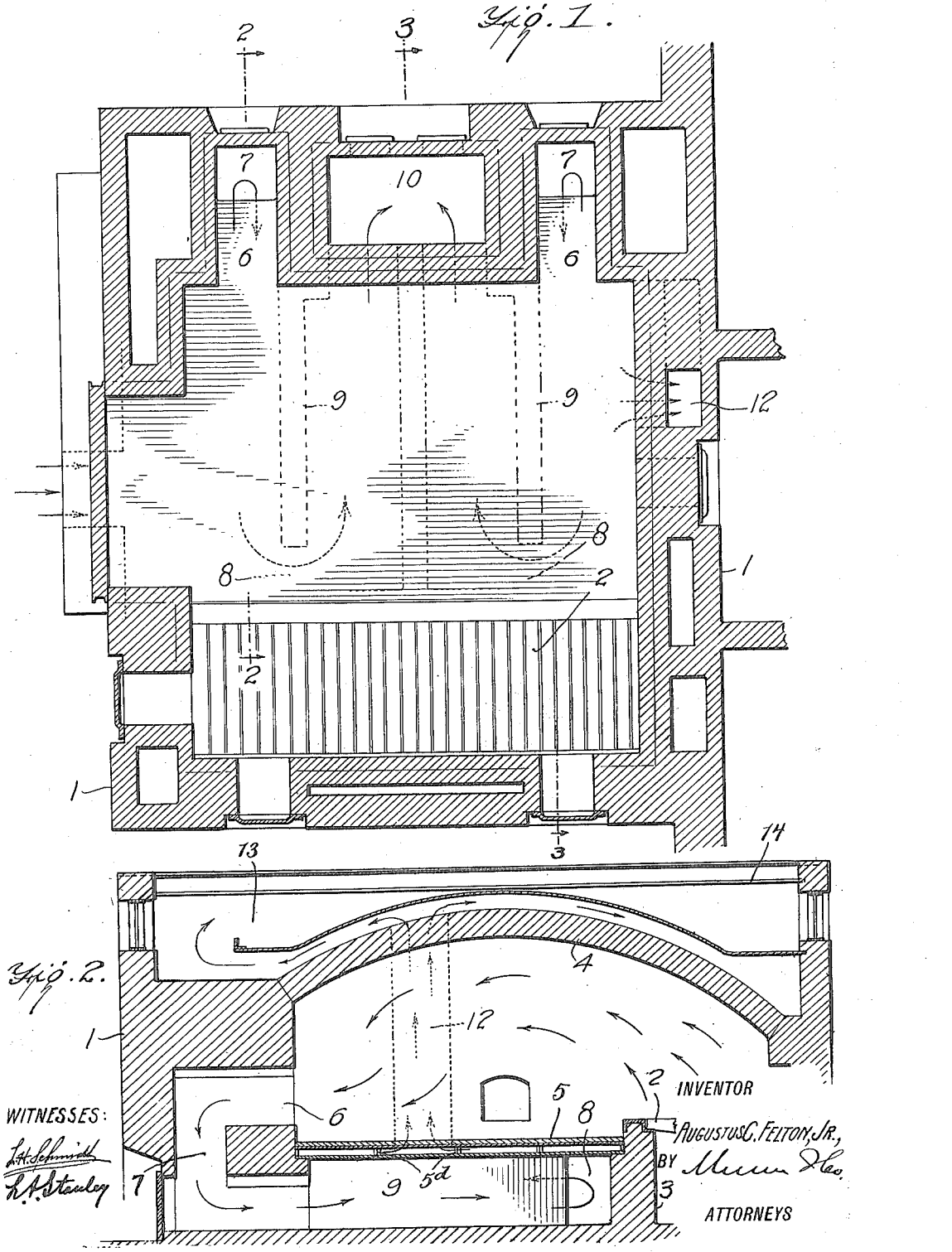

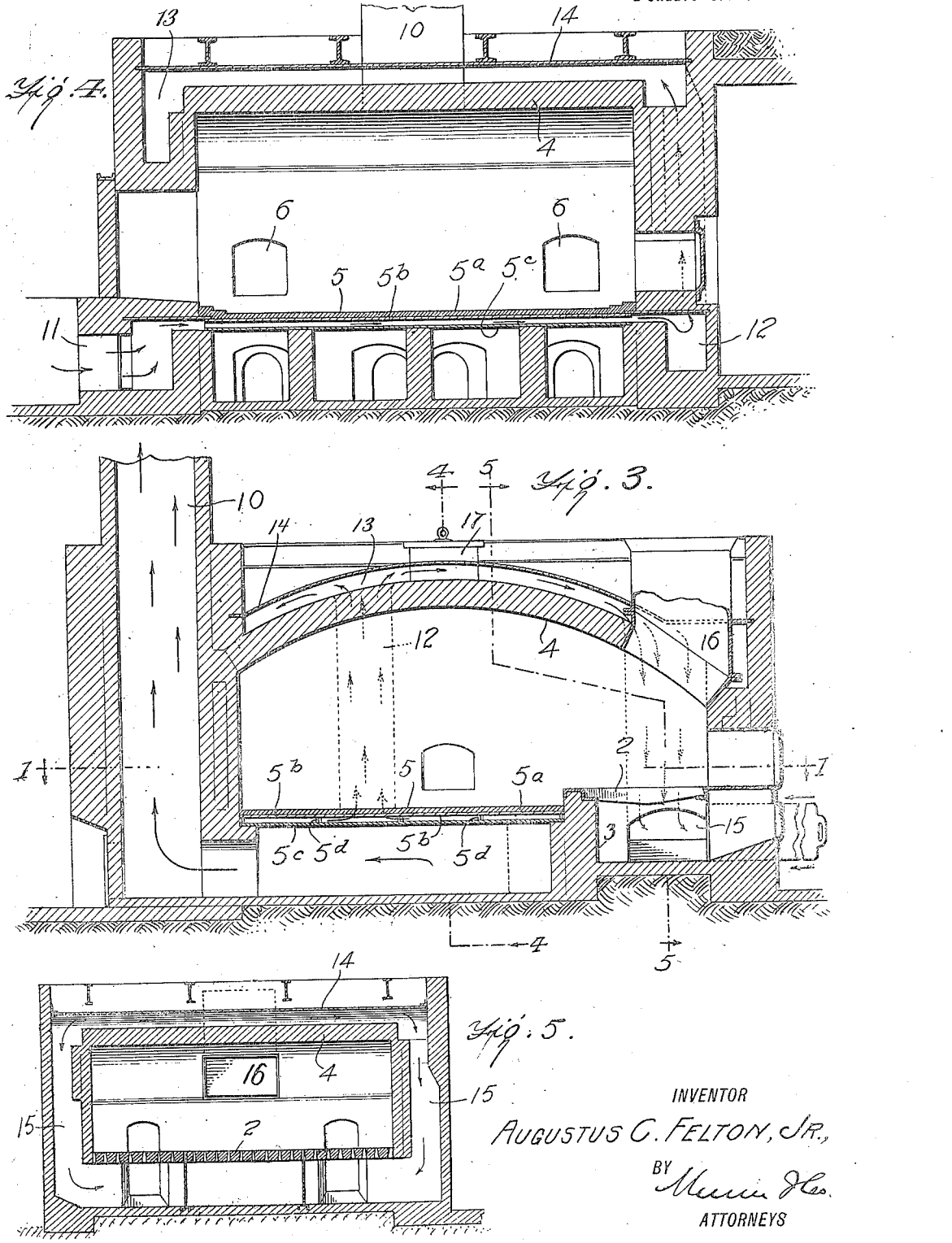

AUGUSTUS C. FELTON, JR., OF MACON, GEORGIA.

CREMATORY.

1,213,766.   Specification of Letters Patent.   Patented Jan. 23, 1917.

Application filed July 3, 1916.   Serial No. 107,299.

*To all whom it may concern:*

Be it known that I, AUGUSTUS C. FELTON, Jr., a citizen of the United States, and a resident of Macon, in the county of Bibb, in the State of Georgia, have invented a new and useful Improvement in Crematories, of which the following is a specification.

My invention relates to improvements in crematories, more particularly to garbage crematories and it consists in the combinations, constructions and arrangements herein described and claimed.

An object of the invention is to provide a garbage crematory in which the burning of the material is accomplished at a minimum expense and in such a manner as to completely consume the combustible portions of the material and leaving very little ash.

A further object of my invention is to provide a device of the type described, in which the air for maintaining combustion is pre-heated to a high degree before being delivered to the combustion chambers.

A further object is to provide novel means for cooling a cast iron floor of the night-soil pan and conserving the heat abstracted from the pan in the cooling thereof.

Other objects and advantages will appear in the following specification and the novel features of the invention will be particularly pointed out in the appended claims.

My invention is illustrated in the accompanying drawings, forming a part of this application, and in which:

Figure 1 is a horizontal section along the line 1—1 of Fig. 3; Fig. 2 is a section along the line 2—2 of Fig. 1; Fig. 3 is a section along the line 3—3 of Fig. 1; Fig. 4 is a section along the line 4—4 of Fig. 3; Fig. 5 is a section along the line 5—5 of Fig. 3.

Referring now particularly to Figs. 1 to 5, inclusive, I have shown therein a furnace having exterior walls 1, inclosing a combustion chamber having a grate 2, beneath which is an ash pit 3. The combustion chamber is provided with an arched roof 4. Disposed alongside of the grate 2 and slightly below the level of the latter is the night soil pan 5. As will be seen from Fig. 3, this preferably consists of an upper layer of refractory material $5^a$, such as fire clay plates or similar material, which forms a protective covering for cast iron plates $5^b$. The latter are spaced apart from similar plates $5^c$, by means of spacing lugs $5^d$. At one side of the combustion chamber and opposite the grate are openings 6. These openings communicate with flues 7, see Fig. 2, which lead to the space 8 underneath the night soil pan. Partitions 9 extend into this space so as to cause the hot gases to take circuitous paths before reaching the stack 10. These partitions are shown in dotted lines in Fig. 1 and in full lines in Fig. 2. As will be seen from Fig. 4, there is an air intake 11 at one end of the furnace which communicates with the space between the upper and lower cast iron plates $5^b$ and $5^c$. At the opposite end of the furnace is an upwardly extending flue 12, through which the air passes into the space 13 between the fire brick arch 4 and the jacket 14. From thence it passes downwardly through the flue 15 (see Fig. 5) and is delivered underneath the grate 2. In Fig. 3, I have shown a chute 16, by means of which the furnace may be charged, while a chute 17 is the night soil chute. The air is passed through the air intake 11, and thence through the space between the upper and lower plates $5^b$ and $5^c$, and then inwardly into the conduit 12 and into the space 13, thence downwardly through the passages 15, where it is delivered to the fuel on the grate 2 in a highly heated condition, thereby greatly facilitating combustion. It will be observed that the cold air which enters at 11 has only a short distance to travel to reach the space between the upper and lower plates $5^b$ and $5^c$. This results in the cooling of the cast iron plates of the night soil pan, thereby preventing them from burning out under intense heat. At the same time, it also tends to transfer heat to the upper side of the fire brick arch 4, thus conserving the heat which is abstracted from the iron plates of the night soil pan.

I claim:

1. In a crematory, a combustion chamber having an arched roof, a grate disposed at one side of said combustion chamber, a night-soil pan disposed on the other side of said combustion chamber contiguous to said grate, a stack or chimney on that side of the furnace contiguous to said night soil pan, flues connecting said combustion chamber with said stack, said flues extending underneath said night-soil pan, said night-soil pan being made of metal plates spaced apart, the upper plates having a thin refractory covering, means for introducing air between said metal plates, and an outlet for the air from the space between the plates.

2. In a crematory, a furnace jacket, a combustion chamber having an arched roof spaced from said jacket, a grate disposed at one side of said combustion chamber, a night-soil pan disposed on the other side of said combustion chamber contiguous to said grate, a stack or chimney on that side of the furnace contiguous to said night soil pan, flues connecting said combustion chamber with said stack, said flues extending underneath said night-soil pan, said night-soil pan being made of metal plates spaced apart, the upper plates having a thin refractory covering, means for introducing air between said metal plates, said last named means comprising an air inlet communicating with the space between the plates, a vertically disposed air conduit communicating at its lower end with the space between the plates and at its upper end with the space between the arched roof and furnace jacket, and an outlet for the air from the roof space.

3. In a crematory, a furnace jacket, a combustion chamber having an arched roof spaced from said jacket, a grate disposed at one side of said combustion chamber, a night-soil pan disposed on the other side of said combustion chamber contiguous to said grate, a stack or chimney on that side of the furnace contiguous to said night-soil pan, flues connecting said combustion chamber with said stack, said flues extending underneath said night-soil pan, said night-soil pan being made of metal plates spaced apart, the upper plates having a thin refractory covering, means for introducing air between said metal plates, said last named means comprising an air inlet communicating with the space between the plates, a vertically disposed air conduit communicating at its lower end with the space between the plates and at its upper end with the space between the arched roof and furnace jacket, and an air passage leading from the roof space to the space beneath the grate.

AUGUSTUS C. FELTON, Jr.